United States Patent
Guha et al.

(10) Patent No.: US 10,875,213 B2
(45) Date of Patent: Dec. 29, 2020

(54) RECYCLING CARBON FIBER BASED MATERIALS

(71) Applicant: Continental Structural Plastics, Inc., Auburn Hills, MI (US)

(72) Inventors: Probir Kumar Guha, Troy, MI (US); Michael Siwajek, Rochester Hills, MI (US); David J. Krug, Auburn Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 166 days.

(21) Appl. No.: 16/063,506

(22) PCT Filed: Dec. 14, 2016

(86) PCT No.: PCT/US2016/066483
§ 371 (c)(1),
(2) Date: Jun. 18, 2018

(87) PCT Pub. No.: WO2017/106243
PCT Pub. Date: Jun. 22, 2017

(65) Prior Publication Data
US 2019/0001532 A1    Jan. 3, 2019

Related U.S. Application Data

(60) Provisional application No. 62/269,429, filed on Dec. 18, 2015.

(51) Int. Cl.
*B29B 17/02* (2006.01)
*C08J 11/08* (2006.01)
(Continued)

(52) U.S. Cl.
CPC ............ *B29B 17/02* (2013.01); *B09B 3/0016* (2013.01); *C01B 32/05* (2017.08); *C08J 11/04* (2013.01);
(Continued)

(58) Field of Classification Search
CPC ............ B29B 17/02; B29B 2017/0293; B09B 3/0016; D01F 9/12; C01B 32/05; C01B 32/158
See application file for complete search history.

(56) References Cited

U.S. PATENT DOCUMENTS

| 7,897,651 B2 | 3/2011 | Ikenaga |
| 2013/0118691 A1 | 5/2013 | George et al. |

(Continued)

FOREIGN PATENT DOCUMENTS

| CN | 102558603 A | * | 7/2012 |
| EP | 1437378 A1 | | 7/2004 |

(Continued)

OTHER PUBLICATIONS

Lester, Edward, et al. "Microwave heating as a means for carbon fibre recovery from polymer composites: a technical feasibility study." Materials Research Bulletin 39.10 (2004): 1549-1556.*

(Continued)

*Primary Examiner* — Richard M Rump
(74) *Attorney, Agent, or Firm* — Blue Filament Law PLLC

(57) ABSTRACT

A process is provided to reclaim carbon fiber from a cured vinyl ester, crosslinked unsaturated polyester, or epoxy thermoset matrix. The composite pieces are added to a polyol solvent composition under to conditions to free more than 95% by weight of the carbon fiber from the composite. The freed carbon fibers are washed and dried to reclaim carbon fiber reusable to reinforce a polymer to form a new (Continued)

FRC article. Solvents are chosen that are low cost and low toxicity. Processing is further facilitated by techniques such as solvent pre-swell of the particles, microwave heating, and sonication to promote thermoset matrix digestion to free reinforcing carbon fibers.

14 Claims, 2 Drawing Sheets

(51) Int. Cl.

| | |
|---|---|
| C08J 11/04 | (2006.01) |
| C01B 32/05 | (2017.01) |
| B09B 3/00 | (2006.01) |
| B29K 307/04 | (2006.01) |
| B29K 105/06 | (2006.01) |
| C08J 11/24 | (2006.01) |
| D01F 9/12 | (2006.01) |

(52) U.S. Cl.
CPC ....... *C08J 11/08* (2013.01); *B29B 2017/0293* (2013.01); *B29K 2105/06* (2013.01); *B29K 2307/04* (2013.01); *C08J 11/24* (2013.01); *D01F 9/12* (2013.01); *Y02W 30/62* (2015.05)

(56) References Cited

U.S. PATENT DOCUMENTS

| | | |
|---|---|---|
| 2014/0023581 A1 | 1/2014 | Adam |
| 2014/0194645 A1 | 7/2014 | Anderson et al. |
| 2014/0343197 A1 | 11/2014 | Guha et al. |

FOREIGN PATENT DOCUMENTS

| | | | | |
|---|---|---|---|---|
| JP | 2005255835 A | 9/2005 | | |
| JP | 2005255899 A | 9/2005 | | |
| JP | 2007246831 A | 9/2007 | | |
| JP | 2008013614 A | 1/2008 | | |
| JP | 2010174249 A | 8/2010 | | |
| JP | 2015036394 A | 2/2015 | | |
| WO | 9425517 A1 | 11/1994 | | |
| WO | 2014098229 A1 | 6/2014 | | |
| WO | WO-2014169846 A1 * | 10/2014 | ........... | C07D 317/28 |

OTHER PUBLICATIONS

Takahiro, Masahiko. "Examination of the Effect of Periodic Stress Wave Irradiation on the Decomposition Rate of Epoxy Resin Used for FRP Under Atmospheric Pressure." Kobunshi Ronbunshu 72.4 (2015): 165-177.*

Yildirir, Eyup, Jude A. Onwudili, and Paul T. Williams. "Recovery of carbon fibres and production of high quality fuel gas from the chemical recycling of carbon fibre reinforced plastic wastes." The Journal of Supercritical Fluids 92 (2014): 107-114.*

Fukuzawa, H. et al., "Solubility of epoxy resin cured with carboxylic anhydriude for epoxy CFRP recycling". 54th SPSJ Annual Meeting 2005—Polymer Preprints, Jpan (2005). vol. 54 (1) 1954.*

Fey, M.W. et al., "Solubility of Sucrose in Aqueous Glycerol and Propylene Glycol", Industrial and Engineering Chemistry, Jun. 1951, pp. 1435-1436, vol. 43, Issue 6; DOI: 10.1021/ie50498a048.

Fukuzawa, H. et al., "Solubility of Unsaturated Polyester Composite Materials in Various Solutions for FRP Waste Recycling", Research & Development Center Hitachi Chemical Co., Ltd., 2nd International Symposium on Feedstock Recycling of Plastics and other Innovative Plastics Recycling Techniques, Ostend, Belgium, Sep. 8-11, 2002, 11 pages.

Vallee, M. et al., "Chemical Recycling of Class A Surface Quality Sheet-Molding Composites", Industrial and Engineering Chemistry Research, Sep. 4, 2004, pp. 6317-6324, vol. 43, Issue 20, © 2004 American Chemical Society; DOI: 10.1021/ie049871y.

Gotto, M., "Chemical recycling of plastics using sub- and supercritical fluids", Journal of Supercritical Fluids, Oct. 2008, pp. 500-507, vol. 47, Issue 3, © 2008 Elsevier B.V.; DOI: 10.1016/j.supflu.2008.10.011.

Yang, P. et al., "Chemical recycling of fiber-reinforced epoxy resin using a polyethylene glycol/NaOH system", Journal of Reinforced Plastics and Composites, 2014, pp. 2106-2114, vol. 33, Issue 22, © 2014 The Authors; DOI: 10.1177/0731684414555745.

International Search Report dated Mar. 17, 2017 for International Application No. PCT/US2016/066483 filed Dec. 14, 2016.

Supplementary European Search Report dated Jul. 10, 2019 for European Application No. 16876520 filed Dec. 14, 2016.

2nd Office Action issued in corresponding Chinese Patent Appln. No. 2016800735768, dated May 18, 2020.

Reasons for Rejection issued in corresponding Japanese Patent Appln. No. 2018-523411, dated Aug. 31, 2020.

Article 94(3) Communication issued in EP16876520.4, dated Oct. 28, 2020.

* cited by examiner

RECYCLING CARBON FIBER BASED MATERIALS

FIELD OF THE INVENTION

The present invention in general relates to sheet molding compounds and in particular to a process of recycling the same to reclaim carbon fiber therefrom.

BACKGROUND OF THE INVENTION

The use of composite materials including fiber reinforced composites has continued to increase in recent years in applications ranging from vehicles to bathroom fixtures. With the increased use of composite materials, the need for recycling of discarded composite has become more acute to keep the composite based materials from filling up landfills, and to conserve resources that are used to form these composites. In general, thermoplastic polymers such as polyethylene and polypropylene may be recycled through remelting/spinning of the polymers. However, for thermosetting composites such as fiber reinforced composites (FRCs), however, melt recycling is difficult because of the cross-linked nature of the resin.

A recycling method that has been tried to recycle FRC based materials is solvolysis that employs reactive solvents such as benzyl alcohol, diethylene glycol, diethylene glycol monomethyl ether in the presence of a tripotassium phosphate hydrate catalyst under an inert atmosphere and temperatures of 190° C. to break down ester bonds in polyester thermoset resins, while effectively keeping the properties of the reinforcing fibers. While this method as developed by Hitachi Chemical Co., Ltd. proved effective in separating resin from glass fiber, the resulting glass fibers where damaged in the process, also the cost of solvents, and reaction times rendered the process impractical. (H. Fukuzawa et al., $2^{nd}$ Intl. Symp. On Feedstock Recycling of Plastics and Other Innovative Plastics Recycling Techniques, Ostend, B E, Sep. 8-11, 2002.

Other techniques to recycle FRCs were able to solubilize epoxy resin matrices containing carbon fibers or glass fibers using poly(ethylene glycols) in a sodium hydroxide solution. The carbon fibers and non-alkali fibers recovered after matrix solvolysis retained more than 94% of their original strength; however, the method has met with limited acceptance owing to the specificity of the chemistry towards epoxy matrices and a low overall recycle efficiency. P Yang et al. J. Reinforced Plastics and Composites; 2014, 33(22): 2106-2114.

Aminolysis of FRCs is attractive in yielding carbon fibers with 97% purity. Vallee, M.; Tersac, G.; Destais-Orvoen, N.; Durand, G. "Chemical Recycling of Class Surface Quality Sheet-Molding Composites" Ind. Eng. Chem. Res., 43, 6317-6324 (2004). The method involves an elevated temperature solvent digestion in excess of ethanolannine in the presence of catalysts such as glacial acetic acid, sodium acetate or potassium sulfate; followed by washing the recovered carbon fibers in a boiling solvent such as methyl ethyl ketone (MEK), sonication and drying. While the aminolysis process is somewhat effective, the method has met with limited acceptance owing to the long process times up to 48 h, as well as the cost and toxicity of the solvents.

Thus, there exists a need for a more efficient, less time consuming, cost effective, and environmentally friendly recycling process for breaking down a thermoset resin matrix to reclaim a high percentage of carbon fibers that are suitable for reusing carbon fibers.

SUMMARY OF THE INVENTION

A process is provided to reclaim carbon fiber from a cured thermoset matrix. Cured thermoset matrix containing carbon fiber inclusions is optionally ground to form particles. The thermosetis added to a polyol solvent composition under conditions to free more than 95% by weight of the carbon fiber from the particles. The freed carbon fibers are washed and dried to reclaim carbon fiber reusable to reinforce a polymer to form a new FRC article. Solvents are chosen that are low cost and low toxicity. Processing is further facilitated by techniques such as solvent pre-swell of the particles, size reduction, microwave heating, and sonication to promote thermoset matrix digestion to free reinforcing carbon fibers.

BRIEF DESCRIPTION OF THE DRAWINGS

The present invention is further detailed with respect to the following drawings. These drawings are intended to illustrate various aspects of the present invention, and not be a limitation on the practice thereof.

DESCRIPTION OF THE INVENTION

The present invention has utility in reclaiming reusable carbon fibers from thermoset matrices, and in particular polyester, vinyl ester, polyurethane or epoxy matrices. While the prior art has attempted to react a thermoset to create reactive monomers and oligomers from the thermoset matrix, the present invention is optimized for reclamation of carbon fiber from such a matrix. The carbon fiber as an inert inclusion in a thermoset matrix is considerably easier to reclaim in reusable form compared to matrix precursors. Additionally, with carbon fiber having a cost of approximately US$22 per kilogram, there is an economical and environmental motivation to preclude such fibers from being discarded.

In certain embodiments of the present invention, the cost of materials and processing to reclaim carbon fibers is less than the cost of new carbon fiber upon consideration of the disposal cost of the spent thermoset article containing the carbon fiber. It is appreciated that use of certain solvents and catalysts, while effective to break covalent bonds in a thermoset matrix having inherent costs, handling hazards, or disposal costs that render the resulting process a mere academic curiosity. Exemplary of such processes are those detailed in the prior art. While processing time and energy inputs are factors in the efficiency of the inventive process, it has been found that the discovery of a low cost, low toxicity solvent in which to digest a thermoset matrix largely dictates whether a process is viable for industrial scale carbon fiber reclamation.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 1:
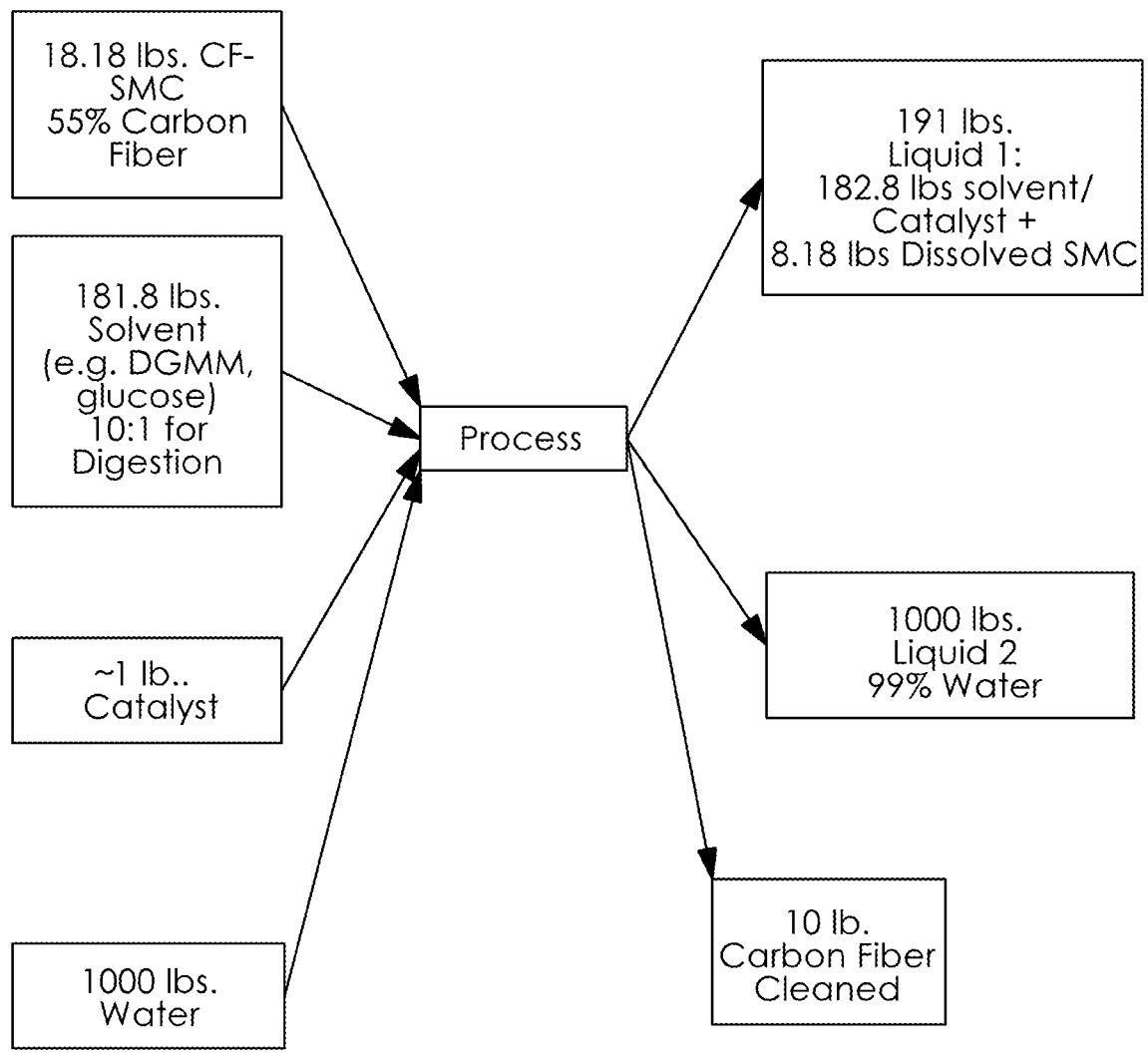
FIG. 1 is a schematic illustrating input and output materials and quantities into a specific embodiment of the present invention.
Figure 2:
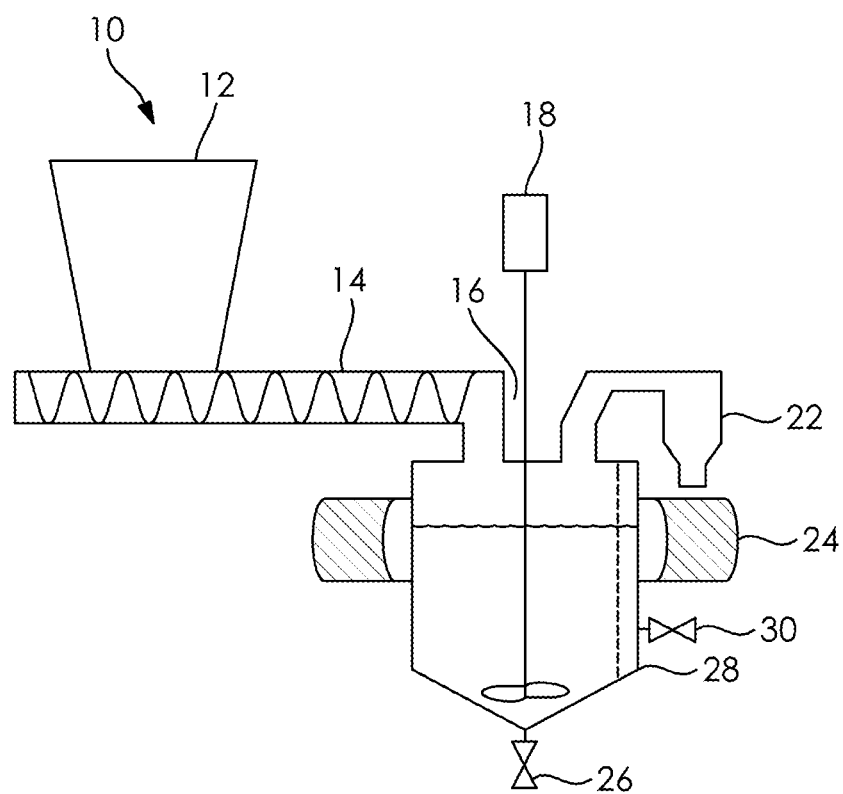
FIG. 2 is a schematic of a batch reactor in which an inventive process is practiced.

The input and output materials for an inventive process is shown schematically in FIG. 1 in the unit of pounds. In FIG. 1 Sheet molding composition (SMC) having a vinyl ester cured matrix containing 55% by total weight of chopped carbon fiber, totaling 4.5 kilograms of carbon fiber is digested to with consumption of solvent and water to yield dry carbon fiber with better than 95% yield by weight of carbon fibers in the SMC. In other inventive embodiments the yield of dry carbon fibers is better than 97% yield by weight of carbon fibers in the SMC. In still other inventive embodiments the yield of dry carbon fibers is better than 99% yield by weight of carbon fibers in the SMC. It is appreciated that a cured matrix from which carbon fibers can be reclaimed according to the present invention includes vinyl esters, polyesters, and epoxies; regardless of whether such matrices also include glass fibers.

The present invention affords an economical and environmentally friendly recycling process for breaking down an SMC matrix to the extent needed to release reusable carbon fibers. It has been surprisingly found that matrix digestion to recover carbon fibers can be accomplished with lower inputs of glycolysis reagents, as compared to digestion to matrix monomers and oligomers suitable for repolymerization. Embodiments of the inventive carbon fiber recycling process utilize environmentally solvents that are lower in cost and less toxic than methyl ethyl ketone (MEK), acids, or amines. Polyol solvents suitable for the present invention have common attributes of hydroxyl groups suitable under reaction conditions of cleaving ester bonds in the SMC matrix. Solvents and solvent systems operative herein illustratively include: monosaccharides, disaccharides, such as a glucose-melt or sucrose dissolved in glycols; sugar alcohols such as erythritol, theitol, arabitol, xylitol, ribitol, mannitol, sorbitol, galactitol, fucitol, iditol, inositol, volemitol, isomalt, maltitol, lactitol, maltotritol, maltotetraitol, or combinations thereof; glycols such as ethylene glycol, ethylene glycol monomethyl ether, ethylene glycol monoethyl ether, ethylene glycol monopropyl ether, ethylene glycol monobutyl ether, diethylene, glycol, diethylene glycol monomethyl ether, diethylene glycol monoethyl ether, diethylene glycol dimethyl ether, diethylene glycol diethyl ether, diethylene glycol monopropyl ether, diethylene glycol monobutyl ether, triethylene glycol, triethylene glycol monomethyl ether, triethylene glycol monoethyl ether, tetraethylene glycol, polyethylene glycol (molecular weight 200 to 400), 1,2-propanediol, 1,3-propanediol, 1,2-butanediol, 1,3-butanediol, 1,4-butanediol, 2,3-butanediol, 1,5-pentanediol, glycerol, or dipropylene glycol. It is appreciated that solvent systems are readily produced by dissolved sugars and sugar alcohols that are solids at standard temperature and pressure in glycols to adjust the amount of available hydroxyl groups, as well as the reactiontemperature and economics. The solubility of sucrose in propylene glycols is exemplary of such solvent systems. M. W. Fey et al. Ind. Eng. Chem., 1951, 43 (6), pp 1435-1436. It is appreciated that several glycols are known to form azeotropes with water than reduce solvent usage and afford a solvent system with a stable composition over a range of temperatures.

A solvent system that is more than 95% total weight percent of diethylene glycol monomethyl ether is particularly well suited to provide acceptable solvent cost, reaction time and carbon fiber reclamation. A molten glucose bath also represents a solvent that affords an attractive balance of properties and an aqueous waste stream that requires minimal treatment prior to discharge to a public waste water treatment facility.

Embodiments of the inventive process may be conducted in a process as follows. The SMC cured thermoset matrix is optionally ground to a particle size that while increasing surface area limits shearing of carbon fibers. A typical length of a carbon fiber in an SMC matrix is between 6 and 40 millimeters (mm) in length. Grind particle sizes for an inventive process typically range from 1 to 25 mm in diameter for spherical particulate and a longest linear extent in a X-Y-Z coordinate system for anisotropic particles on average of between 5 and 80 mm. The SMC grind is combined with a glycolysis solvent in a ratio of SMC:solvent of 1:2-20 by weight with the proviso that the number of reactive hydroxyl groups in the solvent or solvent system is in a stoichiometric excess relative to the ester bonds in the SMC matrix. According to the present invention, a batch process is run involving at least 0.75 kilograms of carbon fiber to achieve economies of scale as to thermal management and reactor scale. Solvent is present in a ration sufficient to free more than 95% by weight of the carbon fiber from the composite.

Variables that can be adjusted include the solvent, temperature and time, pressure, atmosphere—eliminate oxygen, provide an inert gas blanket, and the types of catalyst or co-reactant. Although any temperature can be used in digesting the polymer matrix of the particles, a temperature ranging between the melting point and the boiling point of the solvent is preferred. Inert gases operative herein illustratively include nitrogen, argon, carbon dioxide, carbon monoxide, helium and combinations thereof. Typical reaction temperatures range from 125 to 250 degrees Celsius. It is appreciated that the boiling point of the solvent can be increased with a higher than atmospheric pressure to the reaction mixture. Moreover reaction mixture exists under an air atmosphere or in an inert gas and either under atmospheric pressure (normal pressure), under reduced pressure, or under pressure. Other components such as surfactant, antifoaming agent, viscosity reducer, or boiling chip are readily added.

Co-reactants operative in the present invention illustratively include hydroxides, carbonates, hydrogen carbonates and phosphates of alkali metals such as sodium carbonate, sodium hydroxide, sodium hydrogen carbonate, potassium hydroxide, potassium carbonate, potassium hydrogen carbonate, tripotassium phosphate, or a combination thereof. Typical loadings of catalyst range from 0 to 5 total weight percent.

After reaction, the separated carbon fibers are washed and optionally sonicated. The washing is conducted with water. As shown in FIG. 1, 1000 pounds of water is used for washing to produce clean carbon fibers. The resulting separated fibers are dried. In a specific embodiment, the separated fibers may undergo anti-static, coupling, film-former, or other sizing being applied as a coating on the outside of the dried, reclaimed carbon fibers.

Embodiments of the inventive process may be a closed loop process where the byproducts obtained during the fiber recovery are used in the formation of new FRC materials. Solvents in some embodiments are subjected to a recycling process of neutralization, filtering, distillation, or other conventional forms of purification, such as solvent extraction or membrane separation, for reuse in an inventive process or a separate usage.

In some inventive embodiments, the reaction mixture is exposed to sonication prior to or during heating the reaction mixture to a desired temperature. Sonication appears to loosen the carbon fibers from the cured SMC matrix and cleans and detangles the fibers as well.

In still other embodiments, the reaction mixture is exposed to microwave radiation to speed the matrix digestion. Microwaves have frequencies of from 100 MHz to 1000 GHz. 915 MHz and 2450 MHz are conventional klystron output frequencies. Reaction vessels particularly well suited for use with microwave radiation have limited absorption of these wavelengths and illustratively include glass, ceramic or fluoropolymers. It is appreciated that a large reaction vessel is readily equipped with a window of quartz glass or heat-resistant glass operating as a microwave permeable portal. Alternatively, a metallic waveguide serves to allow deliver microwaves into a vessel absorptive of microwaves.

An exemplary reaction apparatus for the inventive process is shown generally at 10. The hopper 12 includes pieces of SMC containing carbon fibers. A screw 14 conveys particles from the hopper 12 to the reaction vessel 16. The vessel 16 is adapted to include the solvent and any catalysts and other material as the particles are metered into the vessel 16 by way of the screw 14. A motor 18 drives a mechanical stirrer 20 to homogenize the reaction conditions. A vapor conduit 22 allows for the collection of volatile matrix breakdown products and solvent. A microwave generator or sonicator 24 is provided to impart energy to the reaction volume within the vessel 16. A drain 26 is provided to facilitate liquid removal from the vessel 16. A filter 28 allows for transmission and collection of size excluded substances such a filler particulate from the reaction mixture via a side siphon valve 30. A heating source for the reaction vessel 16 is not shown and includes conventional resistive heating elements.

Upon matrix digestion to liberate carbon fibers, the fibers are either collected after transmission through a filter 18 or decanted from the reaction mixture and a settled precipitate. The collected carbon fibers are in some embodiments further filtered to remove various insoluble fillers that in typical SMC illustratively include glass fibers, calcium carbonate, thickeners, glass beads, glass microspheres, paint pigments, and natural fibers. The weight of water added to wash the resulting carbon fibers is typically 10 to 100 times the weight of the carbon fiber released from the SMC matrix.

The resulting reclaimed carbon fibers are readily dried in a conventional oven or vacuum oven to remove residual water from the carbon fibers. The resulting carbon fibers are used as if virgin carbon fibers or chemical treating to apply a sizing coating thereto. A sizing is used to modify fiber surface properties and as a result interactions with a new matrix in which the reclaimed carbon fibers will be embedded.

The collected filtrate or recovered organics consisting of oligomers, co-reactant, and solvent can be distilled to recover the excess solvent. The recovered solvent can be used for subsequent carbon fiber recovery reactions while maintaining a recovered carbon fiber purity of >95%. Conventional distillation can be used or the pressure can be reduced to lower the boiling point.

The co-reactant can be removed from the collected recovered organics by neutralization with a suitable acid such as hydrochloric, sulfuric, or acetic acid. Neutralization can be done before or after the solvent recovery step mentioned above.

The recovered and concentrated organic, in some inventive embodiments, after neutralization, can be incorporated into new polymer systems due to and depending upon the nature of the functional groups present. At loadings of 5-50 wt % recovered organics and 95-50 wt % virgin polymer the properties are similar to 100% virgin systems. Alternately the recovered organics can be used as a fuel.

EXAMPLES

The present invention is further detailed with respect to the following examples. These examples are intended to illustrate specific aspects of the present invention and should not be construed as a limitation on the scope of the appended claims.

Comparative Example 25 grams of carbon fiber SMC material that is 55% carbon fiber and 45% polymer is recycled with a 10:1 ratio of solvent of diethylenetriamine (DETA) to SMC. After 24 h reaction time in boiling DETA, carbon fiber was filtered from solution, washed with methyl ethyl ketone, and dried. Fiber purity measured by mass retention at 800° C. via TGA was 97 wt %. The collected organic phase can be used as a curing agent, for example with epoxies, to produce second generation materials.

Example 1

SMC with DGMM as Solvent and High Co-Reactant Loading 25 grams of vinyl ester carbon fiber SMC included 52 wt % carbon fiber and 48 wt % polymer is added to 225 grams of diethylene glycol monomethyl ether and 25 grams of sodium hydroxide for three hours at a temperature of 200° C. The carbon fibers are then filtered, washed with 1 kg of boiling water, rinsed in water, sonicated for 1.5 h in water, and dried. Carbon fiber purity is 97 wt %.

Example 2

SMC with DGMM as Solvent at Ratio of 5:1

50 grams of vinyl ester carbon fiber SMC included 52 wt % carbon fiber and 48 wt % polymer is added to 250 grams of diethylene glycol monomethyl ether and 25 grams of sodium hydroxide for three hours at a temperature of 200° C. The carbon fibers are then filtered, washed with 1 kg of boiling water, rinsed in water, and dried. Carbon fiber purity is 98 wt %.

Example 3

SMC with DGMM as Solvent at Ratio of 7:1

35.7 grams of vinyl ester carbon fiber SMC included 52 wt % carbon fiber and 48 wt % polymer is added to 250 grams of diethylene glycol monomethyl ether and 17.8 grams of sodium hydroxide for two hours at a temperature of 200° C. The carbon fibers are then filtered, washed with 1 kg of boiling water, rinsed in water, and dried. Carbon fiber purity is 99 wt %.

Example 4

SMC with DGMM as Solvent at Larger Scale 1.429 kilograms of vinyl ester carbon fiber SMC included 52 wt % carbon fiber and 48 wt % polymer is added to 10 kilograms of diethylene glycol monomethyl ether and 0.714 kilograms of sodium hydroxide for three hours at a temperature of 200° C. The carbon fibers are then filtered, washed with 20 kg of boiling water, rinsed in water, and dried. Carbon fiber purity is 99 wt %.

Example 5

SMC with DGMM as Solvent, Lower Amount of Co-Reactant 25 grams of vinyl ester carbon fiber SMC included 52 wt % carbon fiber and 48 wt % polymer is added to 250 grams of diethylene glycol monomethyl ether and 3.125 grams of sodium hydroxide for three hours at a temperature of 200° C. The carbon fibers are then filtered, washed with 1 kg of boiling water, rinsed in water, sonicated for 1.5 h in water, and dried. Carbon fiber purity is 99 wt %.

Example 6

SMC with DEG as Solvent 25 grams of vinyl ester carbon fiber SMC included 52 wt % carbon fiber and 48 wt % polymer is added to 237.5 grams of diethylene glycol and 12.5 grams of sodium hydroxide for twenty-three hours at a temperature of 245° C. The carbon fibers are then filtered, washed with 1 kg of boiling water, rinsed in water, sonicated for 1.5 h in water, and dried. Carbon fiber purity is 96 wt %.

Example 7

SMC with DGEE as Solvent 25 grams of vinyl ester carbon fiber SMC included 52 wt % carbon fiber and 48 wt % polymer is added to 250 grams of diethylene glycol monoethyl ether and 12.5 grams of sodium hydroxide for three hours at a temperature of 202° C. The carbon fibers are then filtered, washed with 1 kg of boiling water, rinsed in water, sonicated for 1.5 h in water, and dried. Carbon fiber purity is 98 wt %.

Example 8

CF Reinforced Epoxy-Amine with DEG as Solvent 20 grams of carbon fiber reinforced epoxy-amine included 65 wt % carbon fiber and 35 wt % polymer is added to 200 grams of diethylene glycol and 10 grams of sodium hydroxide for twenty-four hours at a temperature of 245° C. The carbon fibers are then filtered, washed with 1 kg of boiling water, rinsed in water, sonicated for 1.5 h in water, and dried. Carbon fiber purity is 97 wt %.

Example 9

CF Reinforced Epoxy-Amine with DGEE as Solvent 35 grams of carbon fiber reinforced epoxy-amine included 65 wt % carbon fiber and 35 wt % polymer is added to 250 grams of diethylene glycol monoethyl ether and 18 grams of sodium hydroxide for twenty hours at a temperature of 202° C. The carbon fibers are then filtered, rinsed in water, and dried. Carbon fiber purity is 97 wt %.

Example 10

CF Reinforced Epoxy-Amine with DGEE as Solvent with Low Amount of Co-Reactant 35 grams of carbon fiber reinforced epoxy-amine included 65 wt % carbon fiber and 35 wt % polymer is added to 250 grams of diethylene glycol monoethyl ether and 9 grams of sodium hydroxide for twenty hours at a temperature of 202° C. The carbon fibers are then filtered, rinsed in water, and dried. Carbon fiber purity is 96 wt %.

Example 11

CF Reinforced Epoxy-Amine with DGEE as Solvent with Shorter Reaction Time 35 grams of carbon fiber reinforced epoxy-amine included 65 wt % carbon fiber and 35 wt % polymer is added to 250 grams of diethylene glycol monoethyl ether and 18 grams of sodium hydroxide for 16 hours at a temperature of 202° C. The carbon fibers are then filtered, washed in boiling water, rinsed in water, and dried. Carbon fiber purity is 99 wt %.

Example 12

CF Reinforced Epoxy-Amine with DGEE and Recycled DGEE as Solvent 35 grams of carbon fiber reinforced epoxy-amine included 65 wt % carbon fiber and 35 wt % polymer is added to 62.5 grams of diethylene glycol monoethyl ether, 187.5 grams of recycled diethylene glycol monoethyl ether from the distillation of previous reaction, and 18 grams of sodium hydroxide for twenty-one hours at a temperature of 202° C. The carbon fibers are then filtered, rinsed in water, and dried. Carbon fiber purity is 98 wt %.

Example 13

CF Reinforced Epoxy-Amine with DGEE and DEG as Solvent Blend and Shorter Reaction Time 35 grams of carbon fiber reinforced epoxy-amine included 65 wt % carbon fiber and 35 wt % polymer is added to 62.5 grams of diethylene glycol monoethyl ether, 187.5 grams of diethylene glycol, and 18 grams of sodium hydroxide for sixteen hours at reflux. The carbon fibers are then filtered, washed in boiling water, rinsed in water, and dried. Carbon fiber purity is 99 wt %.

Example 14

Neutralization with HCl and Solvent Recovery 350 grams of recovered organics collected from two batches of digested carbon fiber epoxy composite, as described in Example 9, was neutralized by adding dropwise HCl diluted to the same molar concentration as the NaOH in the recovered organics. Resulting pH was 7. Water is then removed via distillation followed by removing 50-90% of the starting amount of diethylene glycol monomethyl ether solvent.

Example 15

Neutralization with $H_2SO_4$ and Solvent Recovery 250 grams of recovered organics collected from a batch of digested carbon fiber epoxy composite, as described in Example 9, was neutralized by adding dropwise H$_2$SO$_4$ (20 vol % in water) to achieve a pH of 7. Sodium sulfate precipitate was filtered from solution and washed with acetone. Water is then removed from the neutralized recovered organics via distillation followed by removing 50-90% of the starting amount of diethylene glycol monoethyl ether solvent.

Example 16

Reuse of Un-Neutralized Recovered Organics 12.5 g of recovered organics collected by polymer dissolution as described in Example 9 and concentrated via distillation to remove 75% of the starting solvent was mixed with 37.5 g of Epon 828 and Jeffamine T-403 mixed at a 1:1 stoichiometry. The resin, with 25 wt % recovered organic content, was cast and cured at 100° C. for 4 hours. Dynamic mechanical analysis shows 98% retention of storage modulus and a 19° C. increase in the glass transition temperature.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process to reclaim carbon fiber from a cured thermoset matrix comprising:
    adding the cured thermoset matrix to a polyol solvent composition under conditions to free more than 95% by weight of the carbon fiber from the cured thermoset matrix, wherein the polyol solvent composition is selected from a group consisting of monosaccharides, disaccharides, sugar alcohols, ethylene glycol, ethylene glycol monomethyl ether, ethylene glycol monoethyl ether, ethylene glycol monopropyl ether, ethylene glycol monobutyl ether, diethylene, glycol, diethylene glycol monoethyl ether, diethylene glycol dimethyl ether, diethylene glycol diethyl ether, diethylene glycol monopropyl ether, diethylene glycol monobutyl ether, triethylene glycol, triethylene glycol monomethyl ether, triethylene glycol monoethyl ether, tetraethylene glycol, 1,2-propanediol, 1,3-propanediol, 1,2-butanediol, 1,3-butanediol, 1,4-butanediol, 2,3-butanediol, 1,5-pentanediol, glycerol, or dipropylene glycol;
    washing the carbon fiber with water; and
    drying the carbon fiber to reclaim the carbon fiber wherein more than 97% by weight of the carbon fiber is freed from said thermoset matrix and wherein more than 99% by weight of the freed carbon fiber is reclaimed;
    wherein said conditions comprise a constant temperature of between 125 and 250 degrees Celsius.

2. The process of claim 1 wherein more than 99% by weight of the carbon fiber is freed from said thermoset matrix.

3. The process of claim 1 wherein said polyol solvent composition comprises more than 95% total weight percent of diethylene glycol monomethyl ether.

4. The process of claim 1 wherein said conditions further comprise an inert gas blanket.

5. The process of claim 1 further comprising swelling said thermoset matrix prior to said adding step.

6. The process of claim 1 further comprising exposing said thermoset matrix to microwave radiation.

7. The process of claim 6 wherein said exposing is prior to said adding step.

8. The process of claim 6 wherein said exposing is after said adding step and prior to said washing step.

9. The process of claim 1 further comprising sonicating said thermoset matrix in said polyol solvent composition.

10. The process of claim 1 further comprising grinding the cured thermoset matrix containing at least 4.5 kilograms of carbon fiber inclusions to form particles prior to the addition of the thermoset matrix to the polyol solvent composition.

11. A process to reclaim carbon fiber from a cured thermoset matrix comprising:
    adding the cured thermoset matrix to a polyol solvent composition under to conditions to free more than 95% by weight of the carbon fiber from the cured thermoset matrix;
    washing the carbon fiber with water; and
    drying the carbon fiber to reclaim the carbon fiber;
    wherein said polyol solvent composition is molten glucose.

12. The process of claim 11 wherein said polyol solvent composition further comprises a sugar alcohol.

13. The process of claim 11 wherein said polyol solvent composition further comprises a monosaccharide or disaccharide dissolved in a glycol.

14. The process of claim 13 wherein said glycol in an aqueous solution.

* * * * *